United States Patent
Fujishiro et al.

(10) Patent No.: US 11,057,959 B2
(45) Date of Patent: Jul. 6, 2021

(54) RADIO TERMINAL

(71) Applicant: KYOCERA CORPORATION, Kyoto (JP)

(72) Inventors: Masato Fujishiro, Yokohama (JP); Noriyoshi Fukuta, Inagi (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/186,618

(22) Filed: Nov. 12, 2018

(65) Prior Publication Data
US 2019/0082489 A1 Mar. 14, 2019
US 2021/0160950 A9 May 27, 2021

Related U.S. Application Data

(63) Continuation of application No. PCT/JP2017/017346, filed on May 8, 2017.
(Continued)

(51) Int. Cl.
*H04W 76/27* (2018.01)
*H04W 8/18* (2009.01)
(Continued)

(52) U.S. Cl.
CPC ............ *H04W 76/27* (2018.02); *H04W 8/18* (2013.01); *H04W 52/02* (2013.01); *H04W 60/00* (2013.01);
(Continued)

(58) Field of Classification Search
CPC ....... H04W 76/27; H04W 8/18; H04W 72/02; H04W 52/02; H04W 60/00; H04W 72/12;
(Continued)

(56) References Cited

U.S. PATENT DOCUMENTS 8,593,990 B1 * 11/2013 Henttonen ........ H04W 36/0094
370/252
9,832,672 B2 * 11/2017 Mochizuki ............ H04W 24/10
(Continued)

FOREIGN PATENT DOCUMENTS

| WO | 2015/029712 A1 | 3/2015 |
| WO | 2016/003218 A1 | 1/2016 |
| WO | 2016/047753 A1 | 3/2016 |

OTHER PUBLICATIONS

Huawei, China Telecom, HiSilicon, RAN initiated paging optimization in light connection, 3GPP TSG RAN WG2 Meeting #93bis, R2-162277, Apr. 11-15, 2016, pp. 2-5, Dubrovnik, Croatia.
(Continued)

*Primary Examiner* — Jay P Patel
(74) *Attorney, Agent, or Firm* — Studebaker & Brackett PC

(57) ABSTRACT

A radio terminal according to an embodiment is used in a mobile communication system. The radio terminal includes a controller configured to, if the radio terminal is in an RRC connected state, perform a predetermined function according to configuration parameters configured from a network. The controller is configured to invalidate at least a part of the configuration parameters in response to the transition of the radio terminal from the RRC connected state to a specific state. The specific state is a state in which signaling is reduced as compared with the RRC connected state and context information of the radio terminal is maintained in the network.

18 Claims, 9 Drawing Sheets

Related U.S. Application Data

(60) Provisional application No. 62/335,882, filed on May 13, 2016.

(51) Int. Cl.

| | | |
|---|---|---|
| *H04W 72/02* | (2009.01) | |
| *H04W 52/02* | (2009.01) | |
| *H04W 60/00* | (2009.01) | |
| *H04W 72/12* | (2009.01) | |
| H04W 48/20 | (2009.01) | |
| H04W 72/04 | (2009.01) | |
| H04W 84/12 | (2009.01) | |
| H04W 88/02 | (2009.01) | |

(52) U.S. Cl.
CPC ........... *H04W 72/02* (2013.01); *H04W 72/12* (2013.01); *H04W 48/20* (2013.01); *H04W 72/042* (2013.01); *H04W 84/12* (2013.01); *H04W 88/02* (2013.01); *Y02D 30/70* (2020.08)

(58) Field of Classification Search
CPC ... H04W 48/20; H04W 72/042; H04W 84/12; H04W 88/02; Y02D 70/14
See application file for complete search history.

(56) References Cited

U.S. PATENT DOCUMENTS

| | | | |
|---|---|---|---|
| 10,129,780 B2 | 11/2018 | Uemura et al. | |
| 2013/0028069 A1* | 1/2013 | Pelletier | H04W 40/248 |
| | | | 370/216 |
| 2013/0260811 A1 | 10/2013 | Rayavarapu | |
| 2014/0307542 A1* | 10/2014 | Fujishiro | H04L 41/0654 |
| | | | 370/225 |
| 2015/0045031 A1* | 2/2015 | Kaikkonen | H04W 36/32 |
| | | | 455/436 |
| 2015/0079991 A1* | 3/2015 | Koskinen | H04W 36/0083 |
| | | | 455/436 |
| 2015/0257094 A1* | 9/2015 | Wei | H04W 52/0261 |
| | | | 370/311 |
| 2016/0135247 A1* | 5/2016 | Ozturk | H04W 52/0212 |
| | | | 455/436 |
| 2016/0205591 A1* | 7/2016 | Hong | H04W 40/02 |
| | | | 370/235 |
| 2016/0309379 A1* | 10/2016 | Pelletier | H04W 76/12 |
| 2016/0345352 A1* | 11/2016 | Langereis | H04B 1/40 |
| 2017/0290020 A1 | 10/2017 | Aiba et al. | |
| 2017/0311284 A1* | 10/2017 | Basu Mallick | H04W 68/02 |
| 2017/0325283 A1* | 11/2017 | Wu | H04W 52/0216 |
| 2017/0332431 A1* | 11/2017 | Kim | H04W 72/048 |
| 2017/0367058 A1* | 12/2017 | Pelletier | H04W 56/0045 |
| 2018/0014275 A1* | 1/2018 | Fujishiro | H04W 36/08 |
| 2018/0212800 A1* | 7/2018 | Park | H04B 7/0626 |
| 2019/0037420 A1* | 1/2019 | Fujishiro | H04W 76/27 |
| 2019/0037459 A1* | 1/2019 | Pelletier | H04W 76/15 |
| 2019/0045408 A1* | 2/2019 | Kim | H04W 36/08 |
| 2019/0045572 A1* | 2/2019 | Kim | H04W 76/27 |
| 2019/0116483 A1* | 4/2019 | Ryu | H04W 76/32 |
| 2019/0166553 A1* | 5/2019 | Ryoo | H04W 74/0833 |
| 2019/0182799 A1* | 6/2019 | Lee | H04W 76/27 |

OTHER PUBLICATIONS

Intel Corporation, RAN based paging mechanism, 3GPP TSG-RAN WG2 Meeting #93bis, R2-162556, Sections 1 and 2, Apr. 11-15, 2016, Dubrovnik, Croatia.

NTT Docomo, Inc., UP modelling for U-plane solution, 3GPP TSG-RAN Meeting WG2#93bis, R2-162485, Sections 1 and 2, Apr. 11-15, 2016, Dubrovnik, Croatia.

Ericsson, RRC Resume signalling flow and RRC actions, 3GPP TSG-RAN WG2#93, Tdoc R2-161751, Section 2, Feb. 15-19, 2016, Malta.

Huawei (Rapporteur), Introduction of NB-IoT, 3GPP TSG-RAN WG2 NB-IOT Ad-hoc#2, R2-163218, May 3-4, 2016, pp. 2-4, Sophia-Antipolis, France.

Ericsson, "36.331 CR to capture introduction of NB-IoT", 3GPP TSG-RAN WG2#93 Meeting, R2-162969, Dubrovnik, Croatia, Apr. 11-15, 2016, 61 pages.

Huawei (Rapporteur), "Report and summary of email discussion [87#22] [LTE/DC] S-RLF and Reestablishment", 3GPP TSG-RAN WG2 Meeting #87, R2-144540, Shanghai, China, Oct. 6-10, 2014, 29 pages.

* cited by examiner

RADIO TERMINAL

RELATED APPLICATION

This application is a continuation application of international application PCT/JP2017/017346, filed May 8, 2017, which claims the benefit of U.S. Provisional Application No. 62/335,882, filed May 13, 2016, the entire contents of which are incorporated herein by reference.

TECHNICAL FIELD

The present disclosure relates to a radio terminal used in a mobile communication system.

BACKGROUND ART

In recent years, with the spread of radio terminals such as smartphones capable of executing a lot of applications, the frequency at which a radio terminal connects to a network and the frequency at which a network performs paging of a radio terminal are increasing.

Therefore, in a mobile communication system, network load accompanying signaling is increasing. In view of such a situation, techniques for reducing signaling are being studied in the 3rd Generation Partnership Project (3GPP), which is the standardization project for mobile communication systems.

SUMMARY

A radio terminal according to an embodiment is used in a mobile communication system. The radio terminal includes a controller configured to, if the radio terminal is in an RRC connected state, perform a predetermined function according to configuration parameters configured from a network. The controller is configured to invalidate at least a part of the configuration parameters in response to the transition of the radio terminal from the RRC connected state to a specific state. The specific state is a state in which signaling is reduced as compared with the RRC connected state and context information of the radio terminal is maintained in the network.

A radio terminal according to an embodiment is used in a mobile communication system. The radio terminal includes a controller configured to perform a process of receiving, from a network, configuration information indicating whether transmission of a specific uplink signal is required in a specific state. The specific uplink signal is an uplink signal defined by the radio terminal to transmit in an RRC connected state. The specific state is a state in which signaling is reduced as compared with the RRC connected state and context information of the radio terminal is maintained in the network. The controller is configured to determine whether to transmit the specific uplink signal based on the configuration information after the radio terminal transitions from the RRC connected state to the specific state.

A radio terminal according to an embodiment is used in a mobile communication system. The radio terminal includes a controller configured to measure a downlink radio state if the radio terminal is in a specific state. The specific state is a state in which signaling is reduced as compared with an RRC connected state and context information of the radio terminal is maintained in the network. The controller is configured to perform measurement in predetermined area units including a plurality of cells, instead of cell units.

A radio terminal according to an embodiment is used in a mobile communication system. The radio terminal includes a controller configured to perform a process of receiving, from a network, information indicating a radio resource pool for uplink transmission. If the radio terminal is in a specific state, the controller is configured to select a radio resource from the radio resource pool and perform the uplink transmission by using the selected radio resource. The specific state is a state in which signaling is reduced as compared with the RRC connected state and context information of the radio terminal is maintained in the network.

A radio terminal according to an embodiment is used in a mobile communication system. The radio terminal includes a controller configured to, if the radio terminal is in a specific state, perform cell reselection of reselecting a target cell to be used as a serving cell of the radio terminal. The specific state is a state in which signaling is reduced as compared with an RRC connected state and context information of the radio terminal is maintained in the network. The cell reselection includes a redistribution procedure for allocating the target cell selected as the serving cell. The controller is configured to invalidate the redistribution procedure in a predetermined period after the radio terminal transitions from the RRC connected state to the specific state.

A radio terminal according to an embodiment is used in a mobile communication system. The radio terminal includes a controller configured to, if the radio terminal is in a specific state, perform cell reselection of reselecting a target cell to be used as a serving cell of the radio terminal. The specific state is a state in which signaling is reduced as compared with an RRC connected state and context information of the radio terminal is maintained in the network. The cell reselection includes a redistribution procedure for allocating the target cell selected as the serving cell. The controller is configured to perform the cell reselection in the specific state by using a special redistribution procedure in which a redistribution procedure for an RRC idle state is changed.

A radio terminal according to an embodiment is used in a mobile communication system. The radio terminal includes a controller configured to, if the radio terminal is in a specific state, perform cell reselection of reselecting a target cell to be used as a serving cell of the radio terminal. The specific state is a state in which signaling is reduced as compared with an RRC connected state and context information of the radio terminal is maintained in the network. The controller is configured to record information about the cell reselection performed during the specific state. The controller is configured to transmit the recorded information to the network.

BRIEF DESCRIPTION OF DRAWINGS

DESCRIPTION OF EMBODIMENTS (Architecture of Mobile Communication System) An architecture of a mobile communication system according to an embodiment will be described. FIG. 1 is a diagram illustrating an architecture of a Long Term Evolution (LTE) system that is the mobile communication system according to a first embodiment. The LTE system is a mobile communication system based on the 3GPP standard.

As illustrated in FIG. 1, the LTE system includes a user equipment (UE) 100, an evolved-UMTS terrestrial radio access network (E-UTRAN) 10, and an evolved packet core (EPC) 20.

The UE 100 corresponds to a radio terminal. The UE 100 is a mobile communication apparatus and performs radio communication with a cell (serving cell).

The E-UTRAN 10 corresponds to a radio access network. The E-UTRAN 10 includes an evolved Node-B (eNB) 200. The eNB 200 corresponds to a base station. The eNBs 200 are connected to each other via an X2 interface.

The eNB 200 manages one or more cells. The eNB 200 performs radio communication with the UE 100 that has established connection with the eNB 200. The eNB 200 has a radio resource management (RRM) function, a user data (hereinafter, simply referred to as "data") routing function, a measurement control function for mobility control and scheduling, and the like. The "cell" is used as the term indicating a minimum unit of radio communication area. The "cell" is used as the term indicating a function of performing radio communication with the UE 100.

The EPC 20 corresponds to a core network. The EPC 20 includes a mobility management entity (MME)/serving-gateway (S-GW) 300. The MME performs various types of mobility control or the like on the UE 100. The S-GW performs data transfer control. The MME/S-GW 300 is connected to the eNB 200 via an S1 interface.

Figure 1:
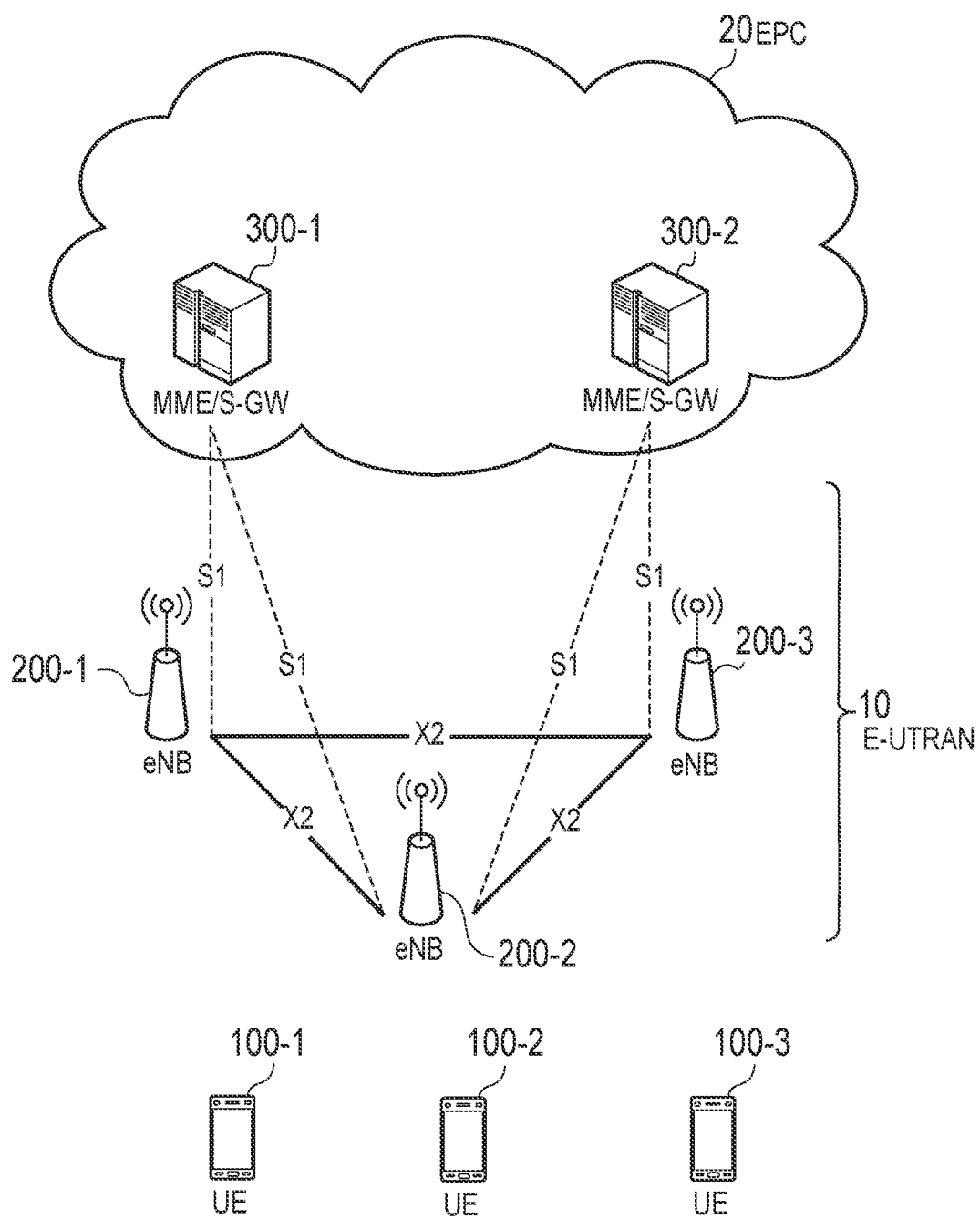
FIG. 1 is a diagram illustrating an architecture of an LTE system according to an embodiment.
Figure 2:
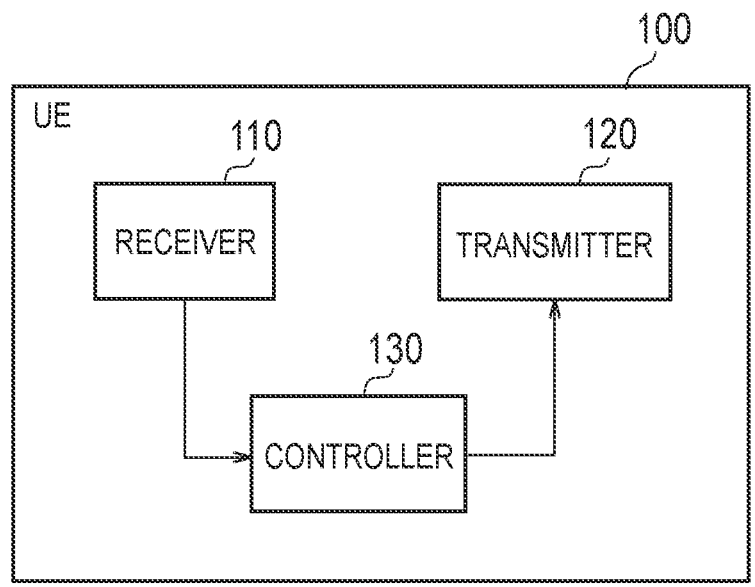
FIG. 2 is a diagram illustrating an architecture of a UE (radio terminal) according to an embodiment.

FIG. 2 is a diagram illustrating the architecture of the UE 100 (radio terminal). As illustrated in FIG. 2, the UE 100 includes a receiver 110, a transmitter 120, and a controller 130.

The receiver 110 performs a variety of reception under the control of the controller 130. The receiver 110 includes an antenna and a receiver. The receiver converts a radio signal received by the antenna into a baseband signal (reception signal) and outputs the baseband signal to the controller 130.

The transmitter 120 performs a variety of transmission under the control of the controller 130. The transmitter 120 includes an antenna and a transmitter. The transmitter converts a baseband signal (transmission signal) output by the controller 130 into a radio signal and transmits the radio signal from the antenna.

The controller 130 performs a variety of control on the UE 100. The controller 130 includes at least one processor and a memory. The memory stores a program executed by the processor and information used for processing by the processor. The processor includes a baseband processor that performs modulation and demodulation, coding and decoding, and the like of the baseband signal, and a central processing unit (CPU) that performs a variety of processes by executing a program stored in the memory. The processor performs a process to be described later.

Figure 3:
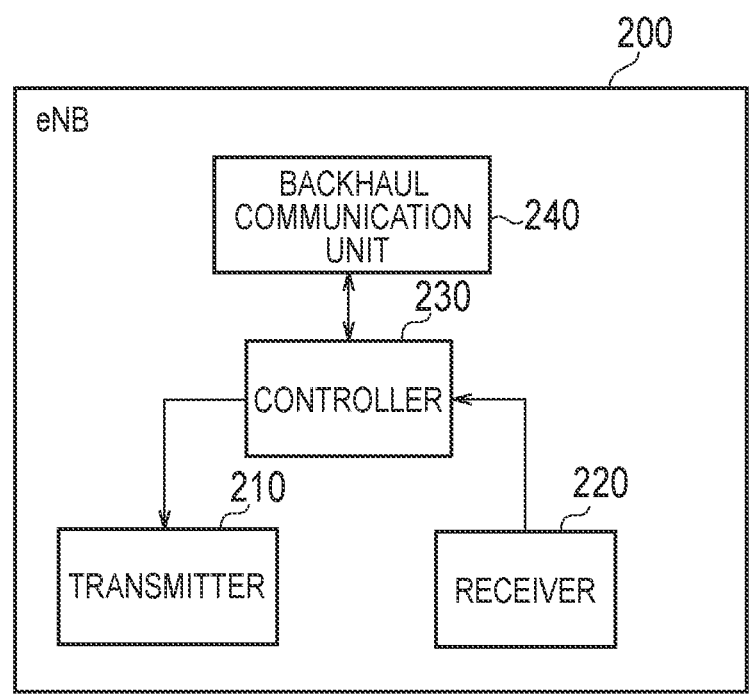
FIG. 3 is a diagram illustrating an architecture of an eNB (base station) according to an embodiment.

FIG. 3 is a diagram illustrating the architecture of the eNB 200 (base station). As illustrated in FIG. 3, the eNB 200 includes a transmitter 210, a receiver 220, a controller 230, and a backhaul communication unit 240.

The transmitter 210 performs a variety of transmission under the control of the controller 230. The transmitter 210 includes an antenna and a transmitter. The transmitter converts a baseband signal (transmission signal) output by the controller 230 into a radio signal and transmits the radio signal from the antenna.

The receiver 220 performs a variety of reception under the control of the controller 230. The receiver 220 includes an antenna and a receiver. The receiver converts a radio signal received by the antenna into a baseband signal (reception signal) and outputs the baseband signal to the controller 230.

The controller 230 performs a variety of control on the eNB 200. The controller 230 includes at least one processor and a memory. The memory stores a program executed by the processor and information used for processing by the processor. The processor includes a baseband processor that performs modulation and demodulation, coding and decoding, and the like of the baseband signal, and a central processing unit (CPU) that performs a variety of processes by executing a program stored in the memory. The processor performs a process to be described later.

The backhaul communication unit 240 is connected to the neighbour eNB 200 via an X2 interface and connected to the MME/S-GW 300 via an S1 interface. The backhaul communication unit 240 is used for communication performed on the X2 interface, communication performed on the S1 interface, and the like.

Figure 4:
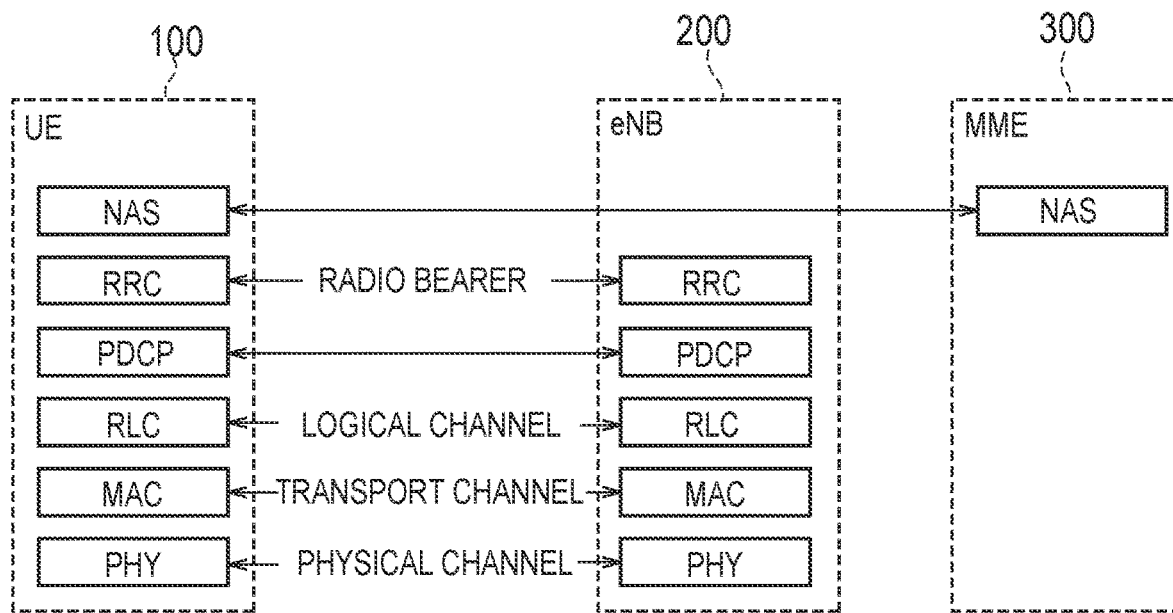
FIG. 4 is a diagram illustrating an architecture of a protocol stack of a radio interface according to an embodiment.

FIG. 4 is a diagram illustrating the architecture of the protocol stack of the radio interface in the LTE system. As illustrated in FIG. 4, a radio interface protocol is divided into a first layer to a third layer of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The PHY layer performs coding and decoding, modulation and demodulation, antenna mapping and demapping, and resource mapping and demapping. Data and control information are transmitted between the PHY layer of the UE 100 and the PHY layer of the eNB 200 via a physical channel.

The MAC layer performs priority control of data, a retransmission process by hybrid ARQ (HARQ), a random access procedure, and the like. Data and control information are transmitted between the MAC layer of the UE 100 and the MAC layer of the eNB 200 via a transport channel. The MAC layer of the eNB 200 includes a scheduler. The scheduler determines uplink and downlink transport formats (transport block size, modulation and coding scheme (MCS)) and resource blocks allocated to the UE 100.

The RLC layer transmits data to the RLC layer on the receiving side by using the functions of the MAC layer and the PHY layer. Data and control information are transmitted between the RLC layer of the UE 100 and the RLC layer of the eNB 200 via a logical channel.

The PDCP layer performs header compression and decompression, and encryption and decryption.

The RRC layer is defined only in a control plane that handles the control information. A message (RRC message)

for various configurations is transmitted between the RRC layer of the UE 100 and the RRC layer of the eNB 200. The RRC layer controls logical channels, transport channels, and physical channels in response to establishment, re-establishment, and release of radio bearers. If there is a connection (RRC connection) between the RRC of the UE 100 and the RRC of the eNB 200, the UE 100 is in an RRC connected state; otherwise, the UE 100 is in an RRC idle state.

A non-access stratum (NAS) layer, which is located above the RRC layer, performs session management, mobility management, and the like.

Figure 5:
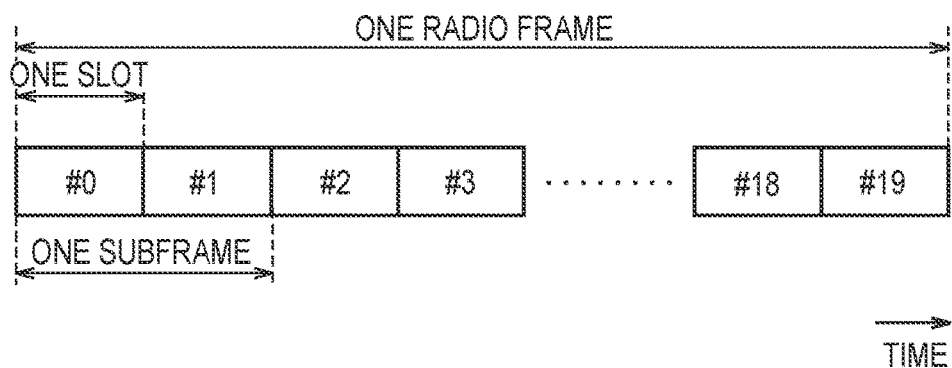
FIG. 5 is a diagram illustrating an architecture of a radio frame according to an embodiment.

FIG. 5 is a diagram illustrating the architecture of the radio frame used in the LTE system. As illustrated in FIG. 5, the radio frame includes ten subframes arranged in a time direction. Each subframe includes two slots arranged in the time direction. A length of each subframe is 1 ms, and a length of each slot is 0.5 ms. Each subframe includes a plurality of resource blocks (RB) in a frequency direction and includes a plurality of symbols in the time direction. Each resource block includes a plurality of subcarriers in the frequency direction. One symbol and one subcarrier constitute one resource element (RE). In addition, among the radio resources (time and frequency resources) allocated to the UE 100, the frequency resource can be specified by the resource block and the time resource can be specified by the subframe (or slot).

In the downlink, a section of several symbols in the head of each subframe is a region that is mainly used as a physical downlink control channel (PDCCH) for transmitting downlink control information (DCI). In addition, the remaining portion of each subframe is a region that is mainly used as a physical downlink shared channel (PDSCH) for transmitting downlink data.

In the uplink, both end portions in the frequency direction in each subframe is a region that is mainly used as a physical uplink control channel (PUCCH) for transmitting uplink control information (UCI). The remaining portion of each subframe is a region that is mainly used as a physical uplink shared channel (PUSCH) for transmitting uplink data.

(Specific State)

A specific state according to an embodiment will be described.

The specific state is a state in which signaling is reduced as compared with the RRC connected state while context information (UE context) of the UE 100 is maintained in the network. The UE context includes information about various configurations and capabilities for the UE 100. The various configurations include a configuration of access stratum (AS). The specific state includes a light connected state and a suspend state. In addition, the light connected state may be a state in which the S1 connection to the UE 100 is maintained. The light connected state may be a state in which the RRC connection is released.

It should be noted that the light connected state may be referred to as a light connection state. In addition, the light connected (light connection) state may be referred to as a light connected (light connection) mode. The suspend state may be referred to as a suspend mode.

The specific state may be started in response to an instruction of the eNB 200. The UE 100 transitions from the RRC connected state to the specific state in response to the instruction from the eNB 200. The specific state may be valid only during the period in which the timer configured to the UE 100 is in operation. In this case, the UE 100 stops the specific state in response to the expiration of the timer. Alternatively, the specific state may be valid only during a period in which the UE 100 exists within a predetermined area. In this case, the UE 100 stops the specific state in response to the movement to the outside of the predetermined area. Alternatively, the specific state may be valid only during a period in which the UE 100 is within a predetermined frequency. For example, the UE 100 that has received the instruction of the specific state in a certain cell ends the specific state in response to the movement to a cell having a frequency different from a frequency to which the cell belongs.

The light connected state is a special RRC connected state in which signaling is reduced as compared with the RRC connected state. For example, the UE 100 in the light connected state is exempt from transmitting and receiving specific signaling with the network. Alternatively, the UE 100 in the light connected state reduces the frequency of transmitting and receiving specific signaling with the network.

The suspend state is a special RRC idle state in which at least part of the UE context is maintained in the network. It should be noted that in the case of the general RRC idle state, the UE context is discarded in the network. The eNB 200 allocates a predetermined identifier (resume ID) when the UE 100 transitions to the suspend state. The UE 100 notifies the eNB 200 of the predetermined identifier when the UE 100 transitions from the suspend state to the RRC connected state. The eNB 200 resumes the use of the UE context based on the predetermined identifier. When the UE 100 moves in the suspend state, the eNB 200 may acquire the UE context from another eNB 200 connected via the X2 interface. The suspend state is an RRC connected state and may be defined as a state in which the connection configuration or the like is held. Alternatively, the suspend state may be defined as an RRC suspend state that is different from the RRC idle state and the RRC connected state. The UE 100 can make a transition (that is, RRC connection setup) from the specific state to the RRC connected state with less signaling by using the maintained UE context.

A new area unit different from the cell and the tracking area can be introduced in the specific state. In the following, an area of such an area unit is referred to as a "predetermined area". The predetermined area is applied to the UE 100 in the specific state (a light connected state or a suspend state). The predetermined area is formed by a group of cells or eNBs 200. The UE 100 may acquire information indicating the predetermined area from the network (the eNB 200 or the MME 300). The information includes at least one of an identifier (group ID) of the group forming the predetermined area, an identifier list (cell ID list) of the cells included in the group, and an identifier list (eNB ID list) of the eNBs 200 included in the group.

The predetermined area may be an area (paging area) in which the network simultaneously broadcasts paging. The predetermined area is an area unit of a limited range as compared with the tracking area. For example, the predetermined area is an area of a part of the tracking area. The predetermined area may be set within the same tracking area. The predetermined area may be set across different tracking areas. By performing paging only in such a narrow area, it is possible to reduce the number of cells that perform paging transmission as compared with the case of performing paging in units of tracking areas. Therefore, it is possible to reduce signaling (paging). It should be noted that the paging transmission in the predetermined area unit may be performed not on the initiative of the MME 300 (MME initiated) but on the initiative of the eNB 200 (eNB initiated). Such paging may be referred to as RAN-based paging. The predetermined area may be referred to as a RAN-base paging area.

The predetermined area may be defined as an area unit in which the network can maintain the context information (UE context). The predetermined area may be formed by a plurality of eNBs 200 mutually connected via an X2 interface. Even if the UE 100 that has transitioned to the specific state within the predetermined area moves to another cell (other eNB 200) within the predetermined area, the UE 100 can perform the RRC connection setup with less signaling.

First Embodiment

A first embodiment will be described below.

If the UE 100 according to the first embodiment is in the RRC connected state, the UE 100 performs a predetermined function according to the configuration parameter configured from the network. The UE 100 (autonomously) invalidates at least a part of the configuration parameters in response to the transition from the RRC connected state to the specific state. Specifically, the configuration parameters include dedicated configuration parameters configured individually for the UE. Such an dedicated configuration parameter may be referred to as "dedicated configuration". The UE 100 invalidates the dedicated configuration parameter in response to the transition of the UE 100 from the RRC connected state to the specific state. The UE 100 may invalidate all the dedicated configuration parameters, or may invalidate only some of the dedicated configuration parameters. The UE 100 may invalidate the dedicated configuration parameters at the timing of transition from the RRC connected state to the specific state. The UE 100 may invalidate the dedicated configuration parameters at a timing when a predetermined condition is satisfied after transitioning from the RRC connected state to the specific state.

It should be noted that "to invalidate the configuration parameter" may be to release (discard) the configuration parameter. Such an operation may be referred to as "deconfigure". Alternatively, "to invalidate the configuration parameter" may be to stop applying the configuration parameter while maintaining the configuration parameter. Such an operation may be referred to as "deactivate". In addition, "to invalidate the configuration parameter" may be to delete the configuration parameter stored as the UE context. In addition, "to invalidate the configuration parameter" may be to save the invalidation flag or delete the validation flag with respect to the corresponding parameter of the UE context.

The specific state is a state in which signaling should be reduced. Therefore, it is not preferable to perform all the functions specified for the RRC connected state in the specific state. Therefore, it is possible to contribute to the reduction of signaling by invalidating at least a part of the configuration parameters in response to the transition from the RRC connected state to the specific state. In the following description, the light connected state is mainly assumed as the specific state.

Figure 6:
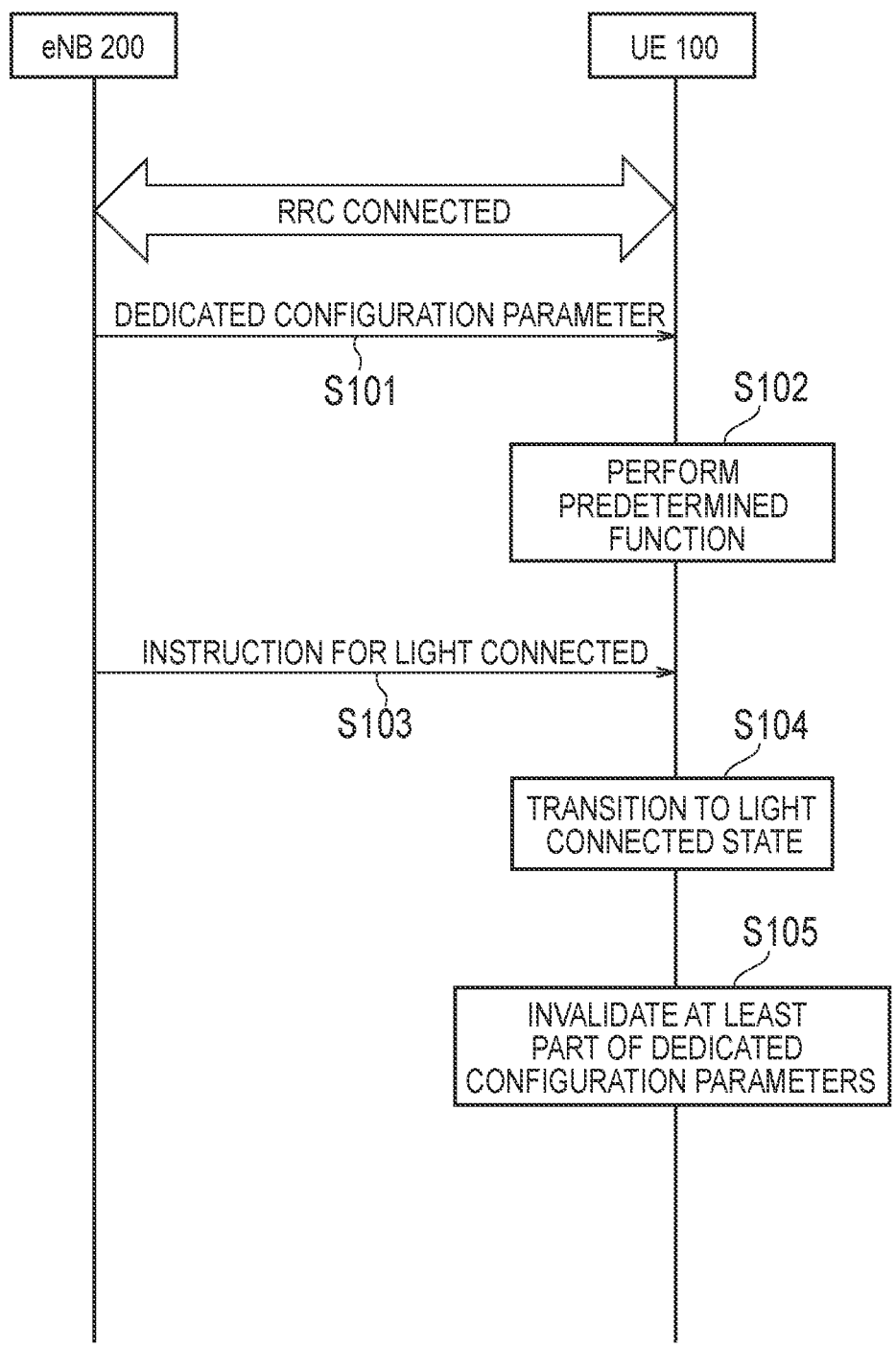
FIG. 6 is a diagram illustrating an operation according to a first embodiment.

FIG. 6 is a diagram illustrating the operation according to the first embodiment. In the initial state, the UE 100 has the RRC connection with the eNB 200 and is in the RRC connected state.

As illustrated in FIG. 6, in step S101, the eNB 200 transmits the dedicated configuration parameter to the UE 100 by individual RRC signaling. The individual RRC signaling may be an RRC connection reconfiguration message. The UE 100 stores the dedicated configuration parameter received from the eNB 200.

It should be noted that the eNB 200 may transmit, to the UE 100, an instruction to activate the dedicated configuration parameter after transmitting the dedicated configuration parameter to the UE 100. The instruction may be transmitted by the MAC control element (MAC CE) or the downlink control information (DCI).

In step S102, the UE 100 performs a predetermined function by activating the dedicated configuration parameter.

The predetermined function may be a function in which the UE 100 performs communication by using a primary resource and a secondary resource at the same time. That is, the predetermined function is a function of increasing the available resources of the UE 100 and improving the throughput by using two kinds of resources in combination. The primary resource may be a resource that handles RRC signaling. The primary resource is used for mobility control of the UE 100 in addition to transmission and reception of data (traffic) of the UE 100. In contrast, the secondary resource may be a resource that does not handle RRC signaling. The secondary resource is mainly used for transmitting and receiving data of the UE 100.

The primary resource may be a primary cell. The secondary resource may be a secondary cell. The UE 100 performs communication by using a plurality of cells (primary cell and at least one secondary cell) at the same time. A case in which the plurality of cells belong to the same eNB 200 is referred to as carrier aggregation (CA). A case in which the plurality of cells belong to two eNBs 200 is referred to as dual connectivity (DC). In the DC, the UE 100 performs communication by using a cell group (master cell group: MCG) belonging to the master eNB and a cell group (secondary cell group: SCG) belonging to the secondary eNB at the same time. The MCG includes one primary cell (PCell) and at least one secondary cell (SCell). The SCG includes one primary and secondary cell (PSCell) and at least one secondary cell (SCell). The PSCell is a special SCell in which the PUCCH of the UE 100 is provided. Dedicated configuration parameters for the SCell are configured to the UE 100 in the CA or DC. It should be noted that the SCell is optional in the DC and the operation is performed only by the PCell and the PSCell.

Alternatively, the primary resource may be a wireless wide area network (WWAN) communication resource. The secondary resource may be a wireless local area network (WLAN) communication resource. In the embodiment, the WWAN communication resource is an LTE communication resource. The UE 100 performs communication by using the LTE communication and the WLAN communication at the same time. Such a function is called LTE and WLAN aggregation (LWA). In the LWA, the dedicated configuration parameters for the bearer (LWA bearer) using the WLAN communication are configured to the UE 100. The LWA bearer is one of split bearer, switched bearer, and IP tunnel.

The predetermined function may be semi-persistent scheduling (SPS) in which radio resources are semi-statically allocated to the UE 100. In the SPS, the dedicated configuration parameters for the SPS are configured to the UE 100.

In step S103, the eNB 200 transitions the UE 100 to the light connected state. For example, the eNB 200 transmits, to the UE 100, the instruction (configuration) to transition to the light connected state by using the UE dedicated RRC signaling. The UE dedicated RRC signaling may be an RRC connection release message including the instruction (configuration).

In step S104, the UE 100 transitions from the RRC connected state to the light connected state.

In step S105, the UE 100 invalidates at least some of the dedicated configuration parameters.

The UE 100 may invalidate the dedicated configuration parameter for the secondary resource in response to the transition from the RRC connected state to the light connected state. In the light connected state, since it is not necessary to improve the throughput of the UE 100, the dedicated configuration parameter for the secondary resource is invalidated.

The UE 100 may invalidate the dedicated configuration parameter for semi-persistent scheduling in response to the transition of the UE 100 from the RRC connected state to the light connected state. In the light connected state, since it is not necessary to semi-statically allocate the radio resource to the UE 100, the dedicated configuration parameter for semi-persistent scheduling is invalidated.

In this way, if the SCell and/or the SPS has been configured (or further activated), the UE 100 in the light connected state autonomously deactivates or de-configures this. In addition, when the UE 100 enters the light connected state, if the LWA bearer is configured, the UE 100 autonomously deactivates or de-configures this.

Modification 1 of First Embodiment

In modification 1 of the first embodiment, a difference from the first embodiment will be mainly described.

In the above-described first embodiment, the UE 100 invalidates the dedicated configuration parameter at a timing when the UE 100 transitions from the RRC connected state to the light connected state. However, the UE 100 may invalidate the dedicated configuration parameter after a predetermined time has elapsed since the UE 100 transitioned from the RRC connected state to the light connected state. In this case, the dedicated configuration parameter is valid for the predetermined time.

In modification 1 of the first embodiment, the predetermined function may be a steering function (traffic steering) for switching the traffic of the UE 100 between the WWAN communication (LTE communication) and the WLAN communication. Such a function is called LTE and WLAN interworking (LWI). The UE 100 uses the dedicated configuration parameter for LWI in a predetermined period after transitioning from the RRC connected state to the light connected state. The dedicated configuration parameter for LWI is referred to as a dedicated RAN assistance parameter. The dedicated configuration parameter for LWI may be referred to as a steering command. The UE 100 invalidates the dedicated RAN assistance parameter when the predetermined period has expired.

Next, an operation example according to modification 1 of the first embodiment will be described with reference to FIG. 6.

As illustrated in FIG. 6, in step S104, the UE 100 transitions to the light connected state. The UE 100 starts a timer if the dedicated RAN assistance parameter is configured when the UE 100 enters the light connected state. Such a timer may be referred to as T350. The value of the timer is configured by the eNB 200. Alternatively, the timer may be a timer that is different from T350. The UE 100 may perform traffic steering according to the dedicated RAN assistance parameter while the timer is in operation.

In step S105, the UE 100 discards the dedicated RAN assistance parameter when the timer has expired.

Modification 2 of First Embodiment

In modification 2 of the first embodiment, a difference from the first embodiment will be mainly described.

In the above-described first embodiment, the UE 100 invalidates the dedicated configuration parameter for the secondary resource in response to the transition of the UE 100 from the RRC connected state to the light connected state. The UE 100 may then further invalidate the dedicated configuration parameter for the primary resource.

Figure 7:
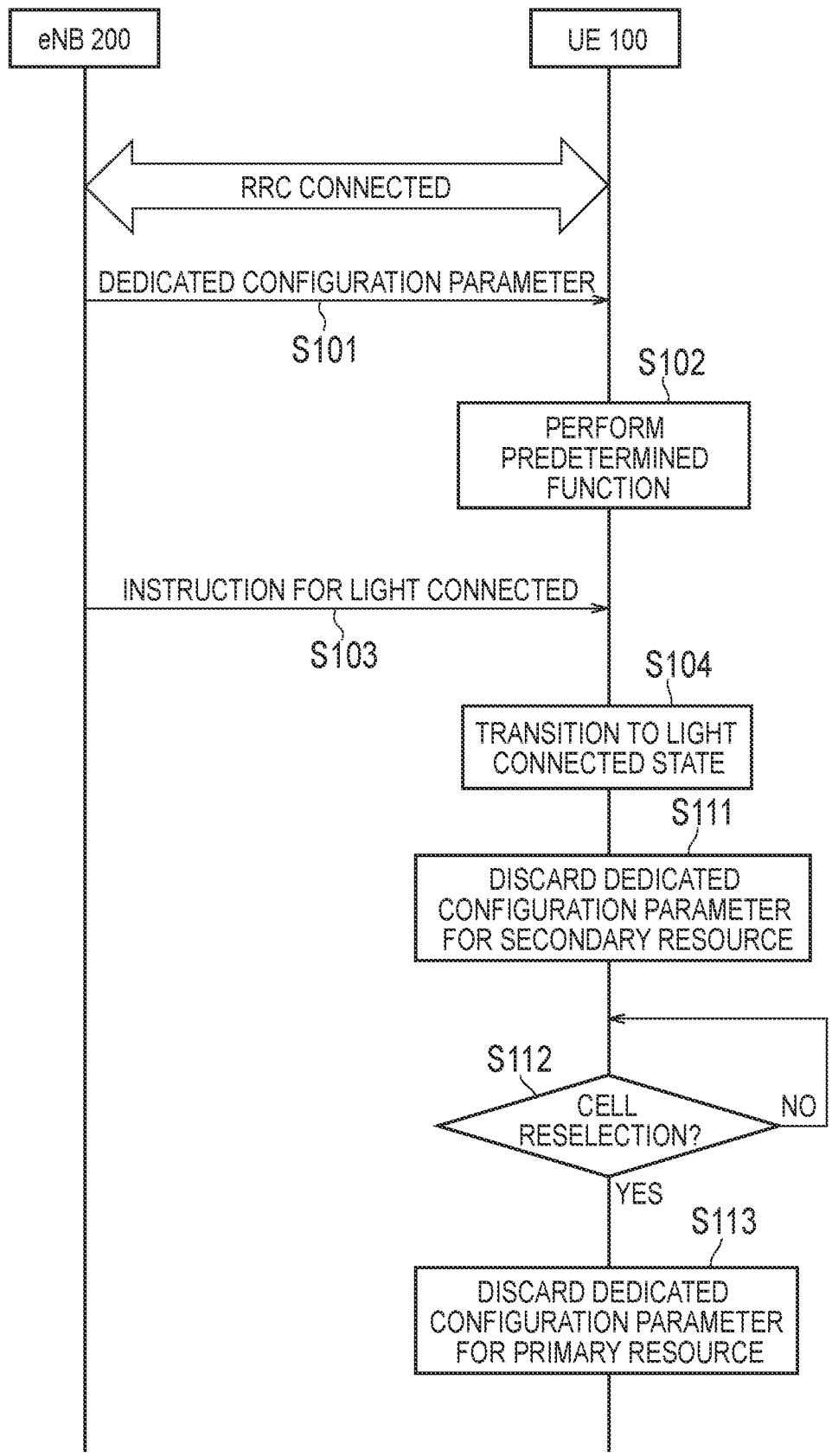
FIG. 7 is a diagram illustrating an operation according to modification 2 of the first embodiment.

FIG. 7 is a diagram illustrating an operation according to modification 2 of the first embodiment. Here, a difference from the above-described first embodiment (see FIG. 6) will be described.

As illustrated in FIG. 7, in step S111, the UE 100 discards the dedicated configuration parameter for the secondary resource (SCell and/or LWA bearer) when the UE 100 enters the light connected state. Alternatively, if a predetermined timer value is configured in the light connected state, the timer may be activated at the time of transition to the light connected state, and the dedicated configuration parameter for the secondary resource may be discarded when the timer has expired.

Further, if the UE 100 performs the cell reselection for reselecting the target cell used as the serving cell (PCell) (step S112: YES), the UE 100 discards the dedicated configuration parameter for the primary resource (PCell) in step S113.

Modification 3 of First Embodiment

In modification 3 of the first embodiment, a difference from the first embodiment will be mainly described.

In the above-described first embodiment, the UE 100 invalidates the dedicated configuration parameter for the secondary resource in response to the transition of the UE 100 from the RRC connected state to the light connected state. However, the UE 100 may not immediately invalidate the dedicated configuration parameter for the secondary resource, but may invalidate the dedicated configuration parameter for the secondary resource by waiting until the predetermined condition is satisfied.

In modification 3 of the first embodiment, after the UE 100 transitions from the RRC connected state to the light connected state, the UE 100 invalidates the dedicated configuration parameter for the secondary resource when a failure in the secondary resource is detected. The failure in the secondary resource is a radio link failure (S-RLF) of the PSCell, a radio link failure of the WLAN (W-RLF), or the like. Due to the failure, the UE 100 falls outside the coverage of the secondary resource.

Figure 8:
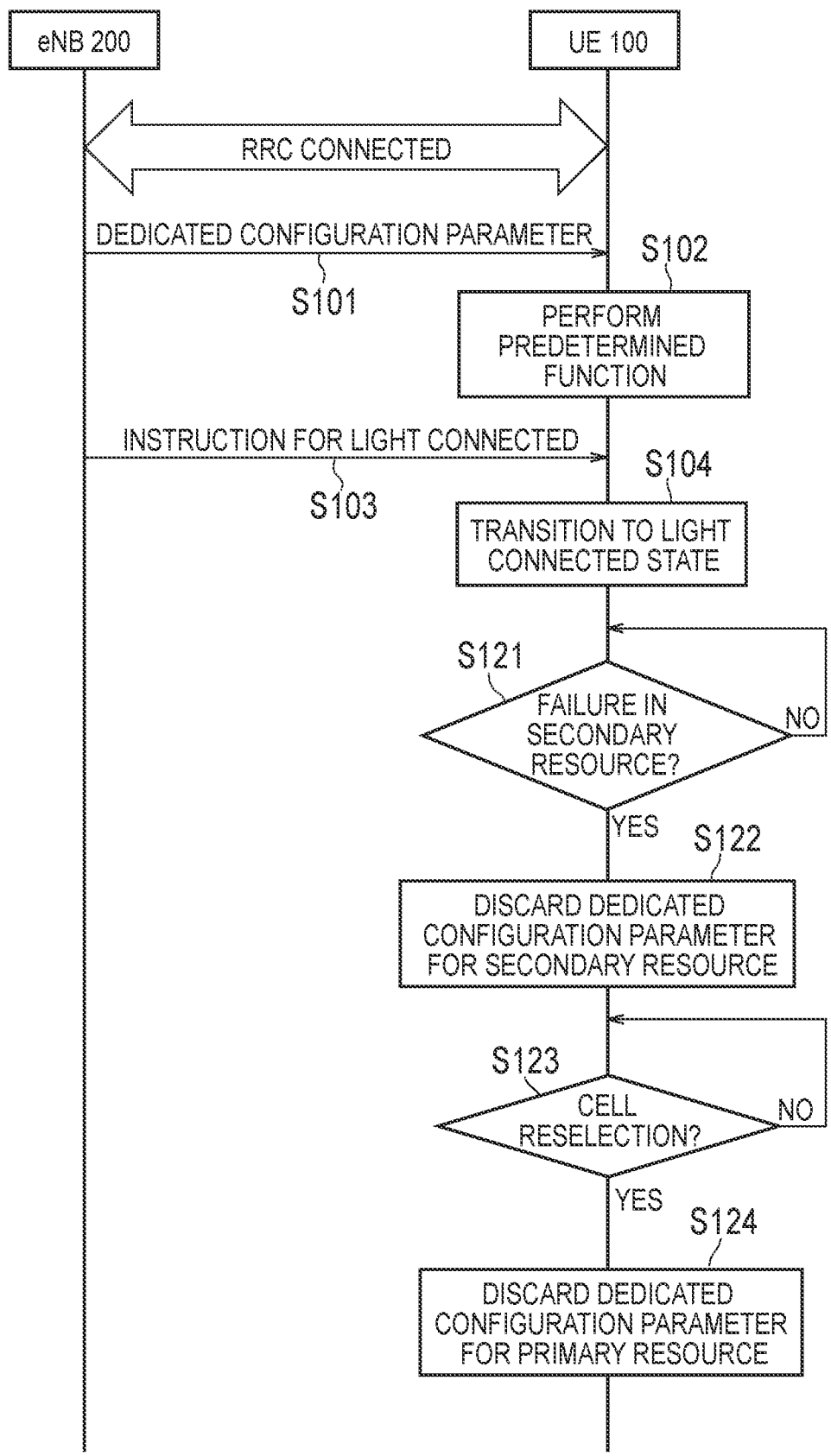
FIG. 8 is a diagram illustrating an operation according to modification 3 of the first embodiment.

FIG. 8 is a diagram illustrating an operation according to modification 3 of the first embodiment. Here, a difference from the above-described first embodiment (see FIG. 6) will be described.

As illustrated in FIG. 8, the UE 100 that has entered the light connected state maintains all the dedicated configuration parameters and continues the measurement of the radio state.

When the failure in the secondary resource is detected by measuring the radio state (step S121: YES), the UE 100 discards the dedicated configuration parameter for the secondary resource (SCell and/or LWA bearer) in step S122.

Further, if the UE 100 performs the cell reselection for reselecting the target cell used as the serving cell (PCell) (step S123: YES), the UE 100 discards the dedicated configuration parameter for the primary resource (PCell) in step S124. Alternatively, if the radio failure of the serving cell is detected, the UE 100 may discard the dedicated configuration parameter for the primary resource.

Second Embodiment

In a second embodiment, a difference from the first embodiment will be described below.

The UE 100 according to the second embodiment receives, from the network, configuration information indicating whether the transmission of a specific uplink signal is required in the light connected state. The specific uplink signal is an uplink signal defined by the UE 100 to transmit in the RRC connected state. After the UE 100 transitions from the RRC connected state to the light connected state, the UE 100 determines whether to transmit the specific uplink signal based on the configuration information.

The specific uplink signal may be an uplink signal including measurement information obtained when the UE 100 measures a downlink radio state. Such a specific uplink signal may be a measurement report or channel state information (CSI). The measurement report is an RRC message for reporting received power and/or reception quality of the reference signal of the cell. The CSI is, for example, a channel quality indicator (CQI).

Alternatively, the specific uplink signal may be an uplink signal including notification information for assisting the determination or measurement performed by the network. Examples of such a specific uplink signal are proximity indication, in-device coexistence indication, UE assistance information, MBMS interest indication, MBMS counting response, sidelink UE information, SRS, and the like (for example, 3GPP technical specification "TS36.331" or the like).

Figure 9:
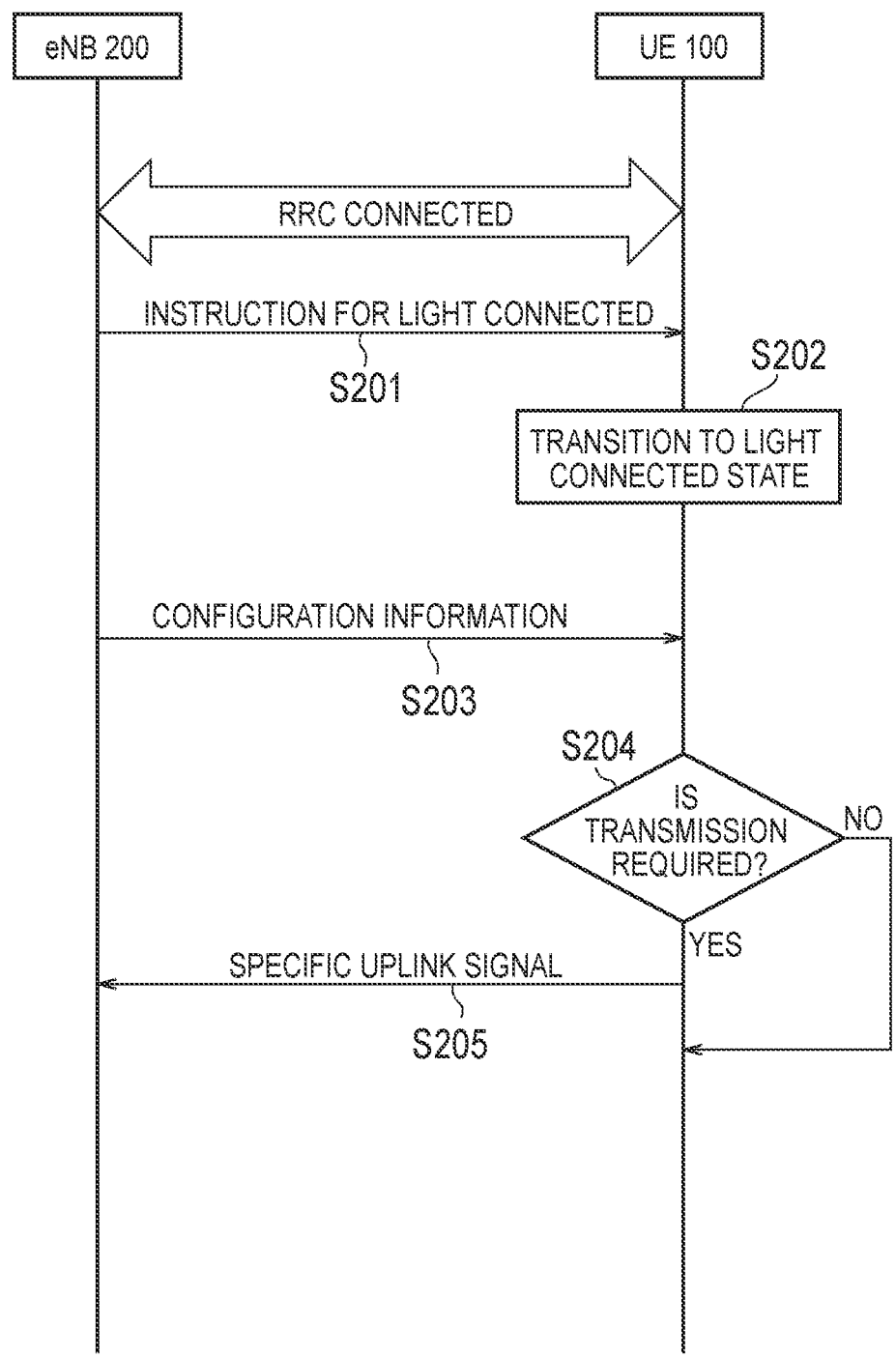
FIG. 9 is a diagram illustrating an operation according to a second embodiment.

FIG. 9 is a diagram illustrating an operation according to a second embodiment. In the initial state, the UE 100 has the RRC connection with the eNB 200 and is in the RRC connected state.

As illustrated in FIG. 9, in step S201, the eNB 200 transitions the UE 100 to the light connected state. For example, the eNB 200 transmits, to the UE 100, the instruction (configuration) to transition to the light connected state by using the UE dedicated RRC signaling.

In step S202, the UE 100 transitions from the RRC connected state to the light connected state.

In step S203, the eNB 200 transmits configuration information indicating whether the transmission of the specific uplink signal is required in the light connected state. The eNB 200 may transmit the configuration information by broadcast signaling. The broadcast signaling may be system information block (SIB).

Alternatively, the eNB 200 may transmit the configuration information by UE dedicated signaling when the UE 100 transitions to the light connection. In this case, in step S201, the eNB 200 may include the configuration information in the instruction to transition to the light connected state.

The configuration information may include a parameter related to the transmission of the specific uplink signal. The parameter may be a parameter that is different from the parameter used in the RRC connected state. The parameter may be a parameter for configuring a transmission trigger of the specific uplink signal or a parameter for configuring a transmission cycle of the specific uplink signal.

In step S204, the UE 100 in the light connected state determines whether to transmit the specific uplink signal based on the configuration information from the eNB 200.

If the UE 100 determines to transmit the specific uplink signal (step S204: YES), the UE 100 transmits the specific uplink signal to the eNB 200 in step S205.

Third Embodiment

In a third embodiment, a difference from the first embodiment and the second embodiment will be mainly described below.

The UE 100 according to the third embodiment measures the downlink radio state if the UE 100 is in the light connected state. Such a measurement may be a radio link monitoring (RLM) measurement that is a measurement of a radio link state, and/or a radio resource management (RRM) measurement that is a measurement for radio resource management. In other words, the RLM measurement is a layer 2 related measurement. The RRM measurement is a layer 3 (RRC) related measurement. The UE 100 performs measurement in predetermined area units including a plurality of cells, instead of cell units.

The RLM measurement of the existing RRC connected state has the following procedure. If a cell problem is detected, the UE 100 starts the T310 (first timer). If the T310 has expired, the UE 100 detects the RLF of the cell, starts the RRC connection reestablishment procedure, and starts the T311 (second timer). If the T311 has expired, the UE 100 transitions to the RRC idle state.

On the other hand, since the light connected state is assumed to perform a mobility control in the predetermined area units including a plurality of cells, it is considered that measurement in cell units is not necessarily appropriate. Therefore, the UE 100 in the light connected state performs the RLM measurement in the predetermined area units.

For example, if a problem is detected in all the cells detected in the predetermined area, the UE 100 in the light connected state may determine the RLF in the RLM measurement. In other words, even if a problem occurs in one cell in a predetermined area, it is not necessary to determine as the RLF if no problem occurs in another cell in the predetermined area. For example, when the UE 100 returns to the RRC connected state, the UE 100 may report the result of the RLM measurement (for example, that there was the RLF) to the network. The result of the RLM measurement may include an identifier of the predetermined area.

Fourth Embodiment

In a fourth embodiment, a difference from the first to third embodiments will be mainly described below.

The UE 100 according to the fourth embodiment receives, from the network, information indicating the radio resource pool for uplink transmission. If the UE 100 is in the light connected state, the UE 100 (autonomously) selects the radio resource from the radio resource pool and performs uplink transmission by using the selected radio resource. Such an uplink transmission may be performed on a contention basis.

Figure 10:
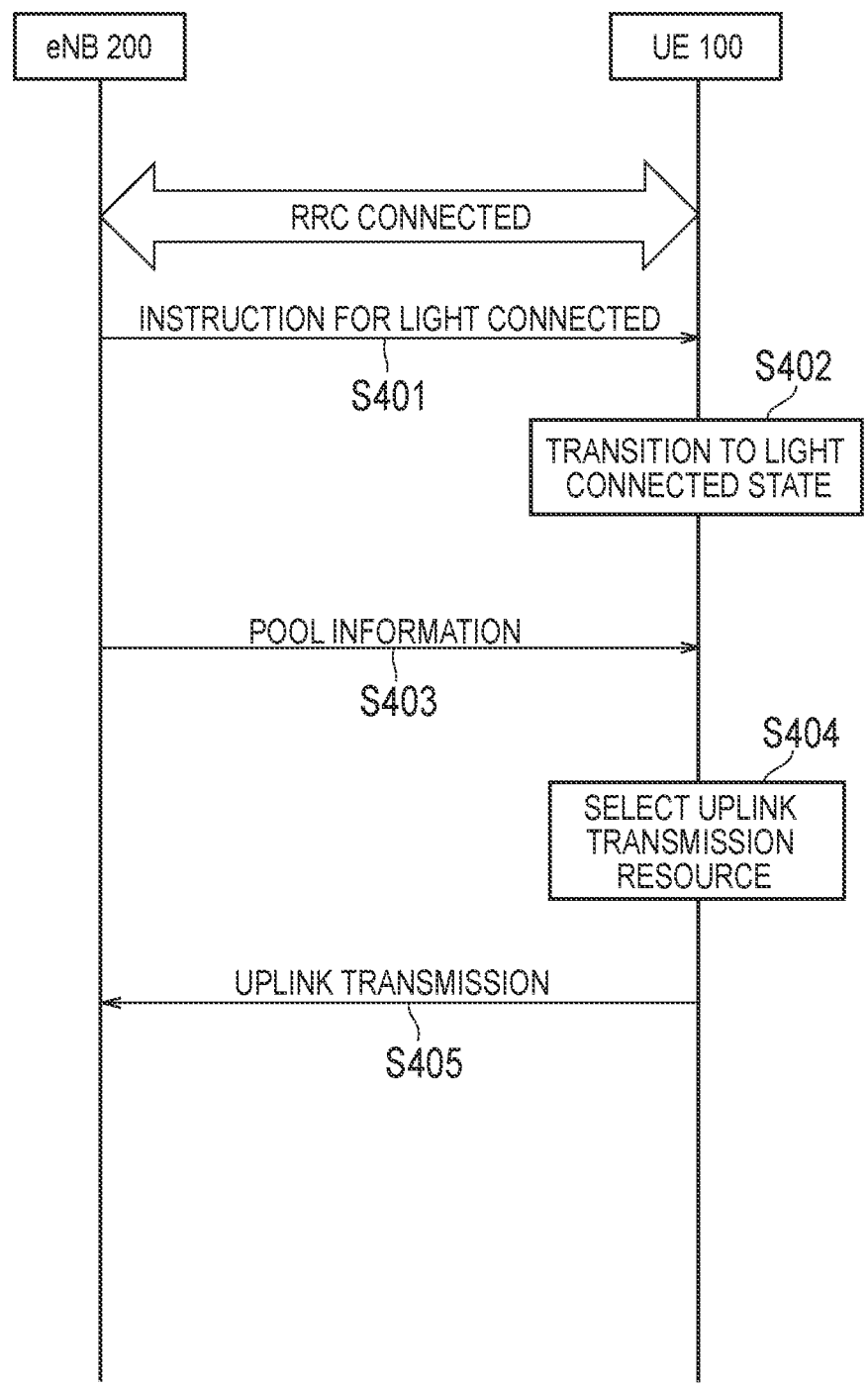
FIG. 10 is a diagram illustrating an operation according to a fourth embodiment.

FIG. 10 is a diagram illustrating an operation according to the fourth embodiment. In the initial state, the UE 100 has the RRC connection with the eNB 200 and is in the RRC connected state.

As illustrated in FIG. 10, in step S401, the eNB 200 transitions the UE 100 to the light connected state. For example, the eNB 200 transmits, to the UE 100, the instruction (configuration) to transition to the light connected state by using the UE dedicated RRC signaling.

In step S402, the UE 100 transitions from the RRC connected state to the light connected state.

In step S403, the eNB 200 transmits information indicating the radio resource pool for uplink transmission. The eNB 200 may transmit the pool information by broadcast signaling (for example, SIB). The pool information includes a radio resource area (frequency and time information) in which the UE 100 in the light connected state may perform uplink transmission.

Alternatively, the eNB 200 may transmit the pool information by UE dedicated signaling when the UE 100 transitions to the light connection. In this case, in step S401, the eNB 200 may include the pool information as the instruction to transition to the light connected state.

The pool information may include parameters (for example, parameters for hopping in units of resource elements) for distributing the radio resources on which the uplink transmission is actually performed on the frequency axis and/or the time axis among radio resource pools for uplink transmission. The parameter is an offset indicating a start position of a resource element on which the uplink transmission is actually performed, an interval of distribution (hopping), and the like. Specifically, parameters such as offsetting from the edge of a certain radio resource area by 3 resource elements and distributing at 4 resource element intervals are designated.

In step S404, the UE 100 in the light connected state selects the radio resource from the radio resource pool based on the pool information from the eNB 200. The UE 100 may select the radio resource by applying an identifier such as an international mobile subscriber identity (IMSI) to a predetermined selection rule. For example, the UE 100 calculates an offset start point by "IMSI mod N". Here, N is a fixed value and may be, for example, 100.

In step S405, the UE 100 performs uplink transmission by using the selected radio resource.

Fifth Embodiment

In a fifth embodiment, a difference from the first to fourth embodiments will be mainly described below.

The UE 100 according to the fifth embodiment performs cell reselection of reselecting a target cell used as a serving cell if the UE 100 is in the light connected state. The cell reselection includes a redistribution procedure for allocating the target cell selected as the serving cell. The UE 100 invalidates the redistribution procedure during a predetermined period after the UE 100 transitions from the RRC connected state to the light connected state.

Such a redistribution procedure is referred to as multi carrier load distribution (MCLD). In the MCLD, the UE 100 selects the redistribution target frequency and cell based on the redistribution parameter notified by SIB 3/5 and the IMSI of the UE 100. The UE 100 performs such a redistribution procedure (redistribution target selection) when the timer (T360) has expired or when a paging indicating redistribution has been received. The T360 is started when the redistribution procedure is performed and the redistribution procedure is invalidated while the T360 is in operation.

Unlike the RRC idle state, the light connected state may cause context transfer or the like as the UE 100 reselects the cell. Therefore, it is not preferable to start the redistribution procedure immediately after transitioning to the light connected state.

Therefore, when the UE 100 transitions to the light connected state, the UE 100 starts the T360 if the redistribution parameter is notified. Therefore, the UE 100 in the light connected state does not immediately perform load redistribution (remains in the cell for a while). After that, UE 100 performs the load redistribution when the T360 has expired.

Modification of Fifth Embodiment

In modification of the fifth embodiment, a difference from the fifth embodiment will be mainly described.

The UE 100 according to the modification of the fifth embodiment performs the cell reselection in the light connected state by using a special redistribution procedure in which the redistribution procedure (redistribution target selection) for the RRC idle state is changed. In other words, the special redistribution procedure for the light connected state is applied to the UE 100 in the light connected state.

Such a special redistribution procedure is a modification of at least one of the following 1) to 3) with respect to the redistribution procedure for RRC idle state.

1) For the list (sorted list) of candidate frequencies and candidate cells that are the redistribution target, only cells associated with the current area (predetermined area) must be considered. Alternatively, the candidate frequencies and candidate cells that are the redistribution target must be cells (or frequencies at which the cells are operated) associated with the current area (predetermined area). It should be noted that, for the serving frequency and cell, if the cell unit redistribution factor (redistributionFactorCell: information about the probability) has been notified, the candidate frequency and candidate cell sets the serving cell; otherwise, the candidate frequency and candidate cell sets the serving frequency. For other frequencies, in each frequency in the frequency list (InterFreqCarrierFreqList), a cell of the best cell (highest ranking) is set if the cell unit list (redistributionNeighCellList) is notified at the corresponding frequency. Otherwise, if at least one cell satisfying S-criteria is found, the corresponding frequency is set.

2) The UE 100 must transition to the RRC connected state (for example, RRC connection reestablishment is started) if it is detected that the highest cell (best cell) in the ranking (comparison and ranking of a plurality of cells on the RSRP basis), the cell included in the ranking, or the cell satisfying S-criteria does not belong to the current area (predetermined area). The UE 100 may transition to the RRC connected state if it is detected that the best cell is a cell having a different frequency from the frequency at which the best cell exists.

3) In addition to the redistribution parameter for the RRC idle state, a redistribution parameter for the light connected state is provided to the UE 100.

Sixth Embodiment

In a sixth embodiment, a difference from the first to fifth embodiments will be mainly described below.

The UE 100 according to the sixth embodiment performs cell reselection of reselecting the target cell to be used as the serving cell of the UE 100 if the UE 100 is in the light connected state. The UE 100 records information about the cell reselection performed during the light connected state (logging). The UE 100 transmits the recorded information (log) to the network. The information about the cell reselection may include information indicating the number of cell reselections performed in the light connected state.

Figure 11:
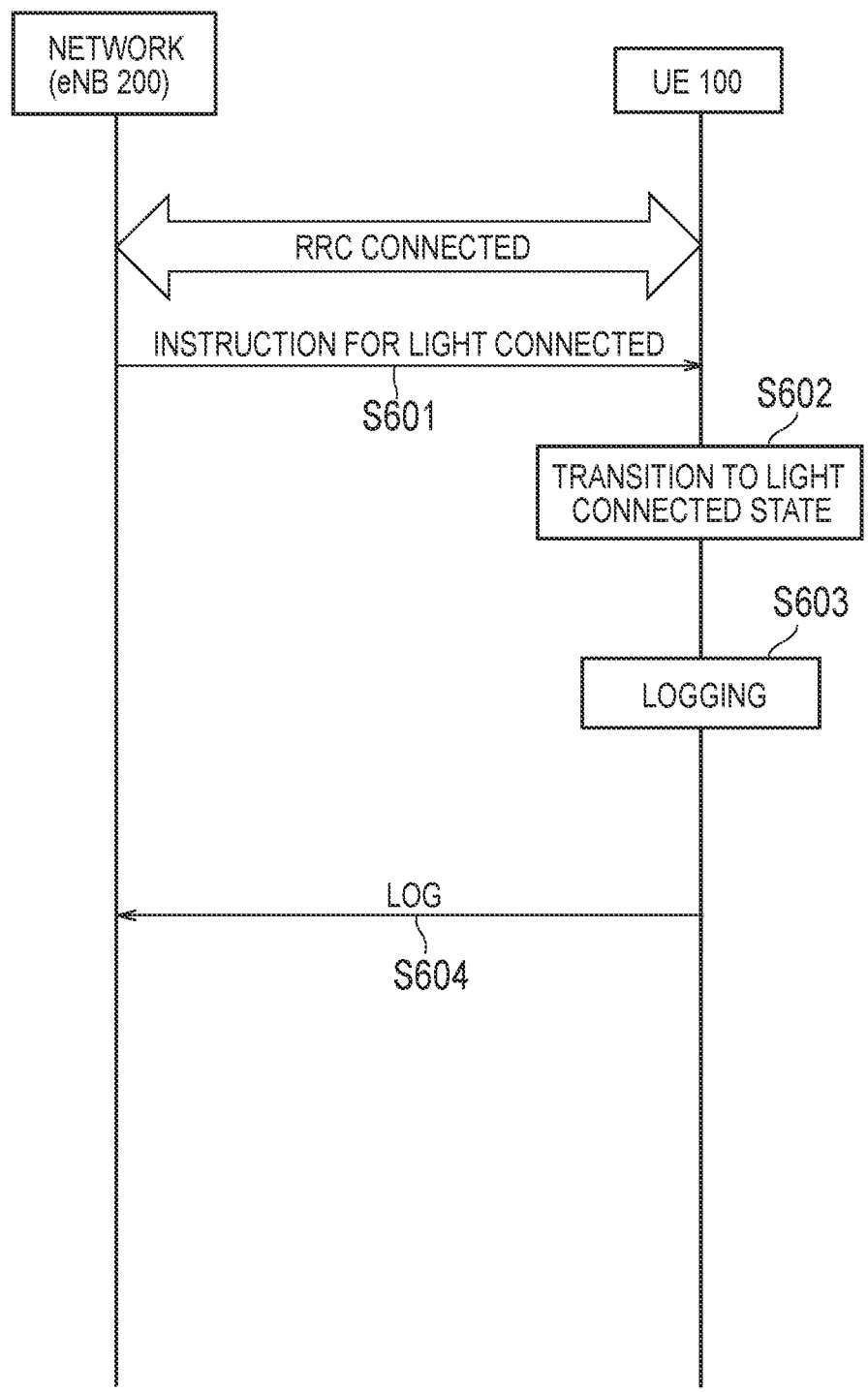
FIG. 11 is a diagram illustrating an operation according to a sixth embodiment.

FIG. 11 is a diagram illustrating an operation according to the sixth embodiment. In the initial state, the UE 100 has the RRC connection with the eNB 200 and is in the RRC connected state.

As illustrated in FIG. 11, in step S601, the eNB 200 transitions the UE 100 to the light connected state. For example, the eNB 200 transmits, to the UE 100, the instruction (configuration) to transition to the light connected state by using the UE dedicated RRC signaling.

In step S601 or before step S601, the eNB 200 may transmit, to the UE 100, configuration parameters related to logging.

In step S602, the UE 100 transitions from the RRC connected state to the light connected state.

In step S603, the UE 100 in the light connected state performs the logging related to the cell reselection.

The logging period may be configured by a timer that defines the period of the light connected state. Alternatively, the UE 100 may perform the logging within a period that exists within the predetermined area described above.

A logging trigger is a periodic trigger or an event trigger. In the case of the periodic trigger, the logging interval may be configured from the eNB 200. In the case of the event trigger, the trigger type may be configured from the eNB 200. The trigger type is output from, for example, a predetermined area, and is RLF, reselection of cells outside the predetermined area, or the like.

The log may include the history of the ID of the predetermined area and the cell ID within the predetermined area. In the case of the event trigger, the log may include the measurement result of the source cell and target cell and the trigger type (cause). The log may include RSRP, RSRQ, and RS-SINR of the serving cell and neighbor cell. In addition, the log may include position information of the UE 100 and the time stamp (time information at the time of log recording).

In step S604, the UE 100 transmits the log obtained in the light connected state to the network (eNB 200). When the UE 100 transitions to the RRC connected state, the UE 100 may notify the eNB 200 that the UE 100 has the log, and may transmit the log in response to the request from the eNB 200. Alternatively, the UE 100 may perform the notification when the logging period has expired.

The UE 100 may transmit, to the eNB 200, a measurement report including the log. Alternatively, the UE 100 may include the log in a message (for example, RRC connection reestablishment) to be transmitted to the eNB 200 when the UE 100 transitions to the RRC connected state.

Until the logging period has expired, the UE 100 may hold the log without discarding the log even if the UE 100 transitions to the RRC connected state or the RRC idle state. In addition, the UE 100 may continue the logging even if the UE 100 transitions to the RRC connected state or the RRC idle state. The UE 100 may resume the logging if the UE 100 returns to the light connected state again.

OTHER EMBODIMENTS

The present disclosure is not limited to the case in which the above-described embodiments are separately and independently performed, but two or more embodiments may be performed in combination. For example, a part of configuration according to one embodiment may be added to other embodiments. Alternatively, a part of configurations according to one embodiment may be replaced with a part of configurations of other embodiments.

The above-described specific state may be referred to as an inactive state. The inactive state may be a new RRC state that is different from the RRC connected state and the RRC idle state.

In addition, the above-mentioned predetermined area may be referred to as a RAN-based notification area.

In the above-described embodiment, the LTE system has been exemplified as the mobile communication system. However, the present disclosure is not limited to the LTE system. The present disclosure may be applied to systems other than the LTE system. For example, the present disclosure may be applied to the 5th (5G) generation mobile communication system.

(Additional note 1)

1. Introduction

Discussion on signaling reduction to enable light connection for LTE has been started. It was extensively discussed on the definition of Light Connection and the gain of paging enhancements, and finally a couple of working assumptions were agreed as follows.

Work assumption to study the paging enhancement is "S1 connection of a UE lightly connected is kept and active, in order to hide the mobility and state transitions from CN".

Work assumption: Light connected UE can be addressed only by the trigger of paging initiated by eNB or MME.

In this additional note, the details of paging enhancements and Light Connection are discussed, under the working assumptions.

2. Discussion

The paging message is used to inform the UEs of the availability of MT calls, the notification of SI update, ETWS, CMAS, and EAB parameters modification, and the trigger of load redistribution. It was reported that the paging message makes up 26.8% of overall RRC signaling load, as statistics in practical LTE networks. Considering all IEs other than the paging information are defined with 1-bit encoding type such as ENUMERATED {true} in Paging, the paging information, i.e., pagingRecordList, is the dominant cause of the signaling load due to a paging message. So, it's effective to consider how the actual paging information contents can be reduced for MT calls, e.g., due to S1 PAGING With such a reduction, it would be possible to reduce the number of transmitted bits within a paging message and the option for the NW to vary the number of the paging transmissions.

Proposal 1: RAN2 should prioritize the study on the reduction of paging information conveyed within paging messages, i.e., the paging record lists.

2.1. RRC States and Modes 2.1.1. RRC Connected State

The easiest way to significantly reduce the number of paging messages would be to force all the UEs in a tracking area to stay in Connected, but it's also the wrong approach from the UE's power consumption point of view. So, this should not be used as the basis for signaling reduction of the paging message.

Proposal 2: UEs should not be kept in RRC Connected, i.e., Rel-13 connected mode, just to reduce the number of pages.

2.1.2. RRC Suspended Mode

It also necessary to evaluate the RRC connection suspend/resume procedures, i.e., the UP solution for NB-IoT, from the paging point of view. Based on the agreements so far, it's assumed that the RRC connection resume is used for the UE to transition from IDLE to Connected, i.e., the UE stays in IDLE when the RRC connection is suspended. For example, it's agreed that "UE in connected mode with AS security activated can be released into idle mode or idle mode with the suspend indication". In other words, the RRC Suspended mode is just a special condition of RRC IDLE.

Observation 1: RRC Suspended mode is a special condition of the UE in IDLE.

Thus, it is necessary for the NW to page the UE in the Suspend mode for MT calls, as similar with the UE in IDLE. This means the gains from paging content reduction cannot be realized if the size of PagingUE-Identity is not significantly different, e.g., difference in the length between the resume ID and S-TMSI/IMSI is small. It is also necessary to consider the number of additional paging transmissions that may be needed compared to Connected state, as a result of the Suspend mode.

Observation 2: Even if the UE is in RRC Suspend mode, the NW will still need to page the UE for MT calls.

2.1.3. RRC Light Connected Mode

As discussed above, LTE has two RRC states, i.e., Connected and IDLE, and a special condition of IDLE, i.e., Suspended mode. When the Light Connected is introduced, it should be discussed whether it's defined as a new RRC state or a special condition of the existing RRC state. If a new RRC state is defined, it's foreseen to define the transitions between three states, whole UE behaviors under the new state, the corresponding control messages and so on, wherein excessive standardization efforts will be necessary. From the simplicity point of view, RAN2 should stick to the current modelling with two RRC states, and therefore, the Light Connected should be defined as a special condition of Connected. This modelling could be well matched with the working assumption "S1 connection of a UE lightly connected is kept and active, in order to hide the mobility and state transitions from CN", which may assume ECM-Connected from the perspective of CN.

Proposal 3: Light Connected mode should be defined as a special condition of RRC Connected, not a new state, even if it's introduced.

2.2. Paging Enhancements 2.2.1. Issue in Paging Optimizations Due to UE Mobility Before Rel-13, paging messages were transmitted in all cells within a tracking area, regardless of whether the target UE(s) is actually located in the cell transmitting the message. In Rel-13, the paging optimizations were introduced by RAN3 and SA2 for the signaling reduction on Uu as well as S1, e.g., the Recommended Cells for Paging IE within S1 PAGING These Rel-13 mechanisms are efficient especially for UEs with low mobility, e.g., MTC UEs, but there may be a room for further optimizations considering UEs with normal mobility, e.g., smartphones. For example, even when the MME determines from/informs the eNB of the recommended eNB/cell within S1 PAGING based on its knowledge of Information On Recommended Cells And ENBs at transition to ECM IDLE, the UE upon this MT call may have already moved outside of the recommended eNB/cell. This would result in missed pages, and the resources used for the pages are wasted.

Observation 3: Paging optimizations introduced in Rel-13, e.g., the Recommended Cells for Paging IE within S1 PAGING, may work effectively only for stationary or low mobility UEs.

2.2.2. Expected Gains with Paging Enhancements

The working assumption mentions that "S1 connection of a UE lightly connected is kept and active, in order to hide the mobility and state transitions from CN", which also implies the UE is in ECM-Connected. In this case, the MME does not need to initiate the paging procedure when a DL data comes for the UE. So, at least from S1 signaling point of view, the signaling reduction will be achieved with a solution under the working assumption.

Observation 4: Signaling reduction of S1 PAGING could be achieved with Light Connected mode.

The various solutions with RAN-level paging mechanism were proposed. One of the benefits in the solutions is to limit the paging area. It indeed contributes to reduce number of paging messages in a whole network, if the RAN-level paging area is set to a subset of a tracking area. Similar gain may be achieved with a NW implementation today, e.g., the tracking area is configured with smaller region. But it has been pointed out that such a NW implementation will cause excessive Tracking Area Updates from UEs, whereby the overall signaling will likely increase.

Although the number of paging messages can be reduced if a smaller paging area is configured, excessive Tracking Area Updates may not be preventable.

From the observations above, the introduction of paging enhancements will offer much benefit and the baseline solution is for the introduction of RAN-level paging. Additionally, in the New RAT SI, many companies proposed to consider some kind of RAN-based paging mechanism to track UEs with low activity, in order to optimize the signaling and the performance for longer battery life. These obviously imply the current CN-based paging mechanism has some room for improvement and an area that needs to be considered in this WI. So, RAN2 should discuss further details of RAN-level paging mechanism.

Proposal 4: RAN2 should consider the details of RAN-level paging concept.

2.3. RAN-Level Paging Mechanism 2.3.1. Paging Message

If Proposal 4 is acceptable, the eNB may notice the necessity of paging upon arrival of DL data for the UE, instead of S1 PAGING The working assumption mentions "Light connected UE can be addressed only by the trigger of paging initiated by eNB or MME", which suggests some sort of paging message is sent to the UE. From the U-plane data flow point of view, the difference at this point between the legacy paging (MME-initiated) and the new paging (eNB-initiated) is whether the DL data is still in the S-GW or already in the eNB, i.e., the routing in the CN is already done. So, it would be worth considering whether the paging message is really necessary in this case, although it's natural way that the eNB sends the (RAN-level) paging message to the UE. One of the other possibilities may aim to eliminate any paging messages over Uu. For example, the eNB sends the DL data immediately, instead of a page to the UE. If the DL data volume can be managed efficiently and is comparable to the amount of data needed for paging messages, the differences may be minimal from a spectral efficiency perspective. The details may be related to how to define the Light Connected mode, including mobility (UE-based or NW-based), thus should be FFS.

Proposal 5: RAN2 should discuss whether the UE should be paged with a paging message (as similar to today) or the direct DL data transmission.

2.3.2. Paging Area

It could also discussed that any transmission to page the UE is performed in a specific area, like the existing tracking area, and it's assumed as a group of cells, i.e., the paging area. It's straight forward to introduce such a concept to minimize paging failure. The paging area may be defined by availability of X2 connectivity for the UE context fetch, mobility state of the UE, balancing to spectral efficiency and so on, while it may be almost up to NW implementation.

Proposal 6: RAN2 should introduce the paging area, which consists of a group of cells to send a transmission to page the UE.

It may be assumed that the UE mobility is transparent to the eNB as long as the UE is within the paging area, On the other hand, it should be discussed how the UE behaves when it moves outside of the paging area. It's a reliable way to inform the serving cell when it happens, since it's quite similar to the existing Tracking Area Update. It's FFS whether the information is provided before the reselection of an outside cell or after it happens.

Proposal 7: RAN2 should discuss whether the UE should inform the serving cell when it moves outside of the paging area.

2.4. Alternative Consideration

As an alternative, the issue discussed in section 2.2.1 may be avoided if the eNB knows the UE's location, e.g., by means of a notification from the UE upon cell reselection. So, it's worth discussing how the eNB knows the location of the UE even in IDLE, to prevent unnecessary pages. It may be solved by the combination of the paging area, i.e., Proposal 6, and the information, i.e., Proposal 7.

Proposal 8: As an alternative to the RAN-level paging concept, RAN2 should discuss if it's useful for the NW to know the location of UEs in IDLE, when Rel-13 paging optimization is performed.

(Additional Note 2)

1. Introduction

The new WI on Signaling reduction to enable light connection for LTE was approved and a couple of agreements as working assumptions was reached.

In the study phase, investigate potential solutions for the following aspects, taking into account both UE mobility and traffic pattern.

Signaling reduction due to handover, considering UE centric mobility, e.g. cell (re)-selection.

Signaling reduction due to Paging, considering limiting the Paging transmission within a more limited area.

Signaling reduction to CN over S1 interface due to mobility and state transitions by hiding them from CN.

UE context storage and retrieval along with UE mobility across different eNBs.

Necessity of a new RAN based state.

Then, based on the conclusion of the study phase, specify the corresponding solutions.

Work assumption to study the paging enhancement is "S1 connection of a UE lightly connected is kept and active, in order to hide the mobility and state transitions from CN"

Work assumption: Light connected UE can be addressed only by the trigger of paging initiated by eNB or MME.

In this additional note, the general issues in Light Connection other than paging aspects are identified.

2. Discussion

The working assumptions agreed in the last meeting uses the terminology "a UE lightly connected" or "Light connected UE", which is one step ahead of the WI title, i.e., Light Connection is somewhat related to UE's condition. The objective of WID also states "Necessity of a new RAN based state" and "the solution can consider reusing the Suspend/Resume procedure". So, it's one of important aspects how to model the light connection, e.g., reusing the RRC Suspend/Resume concept or introducing a new RRC state.

Observation 1: Modelling of Light Connection may be discussed together with paging enhancements.

Regardless of the modelling of Light Connection for paging, the following aspects could be discussed as agreed.

The solution shall apply for both mobile-originated and mobile-terminated data.

The solution shall enable the UE power consumption to be comparable to that one in RRC IDLE.

In general, the features to be adopted for Light Connection should be compared against the existing features as discussed in the following sections.

2.1. General Features 2.1.1. Data Transmission and Reception Aspects (DL/UL/SL)

If the Light Connection is introduced, it needs to be clarified whether the Light connected UE is required to perform data transmission and reception, i.e., downlink (DL), uplink (UL) and sidelink (SL). In the existing IDLE mode, only SL is allowed with "softly" controlled by the eNB, i.e., Type 1 or Mode 2 transmission within the configuration provided in SIB18/19, while DL and UL needs the control signaling in advance, e.g., Paging, RACH and/or RRC Connection Request. In Connected mode, DL and UL are "tightly" controlled by the eNB, i.e., DL assignment and UL grant, while SL may require tight control, i.e., Type 2B or Mode 1 transmission by dedicated resource or SL grant, depending on the eNB's preference.

Proposal 1: RAN2 should discuss on what the UE behavior is for data transmission/reception over Downlink, Uplink and Sidelink in Light Connection.

2.1.2. Measurements and Reporting Aspects (CSI/RLM/RRM)

UEs in Connected perform the various types of measurements, i.e., CSI measurement, RLM measurement and RRM measurement, as well as measurement feedback/reporting. On the other hand, UEs in IDLE only perform RRM measurement for cell reselection without reporting, i.e., UE-based mobility. With Light Connection, it is necessity to discuss which of these measurements and feedback/reporting needs to be supported, which should depend on whether Light Connection is more like CONNECTED or IDLE.

Proposal 2: RAN2 should discuss which measurement and reporting mechanisms, CSI feedback, RLM/RRM measurements, needs to be supported for Light Connection.

2.1.3. Activation and Deactivation Aspects (SCell, SPS)

The SCell(s) could be configured for Carrier Aggregation and Dual Connectivity, and these are activated or deactivated by e.g., the MAC Control Element. Also, SPS is configured for efficient delivery of e.g., VoLTE, and it's activated by PDCCH scrambled with SPS-RNTI. In the current specification, SCell(s)/SPS are de-configured when the UE transitions to IDLE, and it's reconfigured as needed when/after the UE transitions back to Connected. With Light Connection, it's also necessary to define whether SCell(s) and SPS are deactivated or even de-configured.

Proposal 3: RAN2 should discuss whether SCell(s) and SPS is deactivated or de-configured, when the UE transitions from CONN to Light Connection.

2.1.4. Assistance Information from UE Aspects

The current RRC supports many indications from the UE to assist with the eNB's functional control of various mechanisms, i.e., Proximity Indication, In-device Coexistence Indication, UE Assistance Information (Power Preference Indication), MBMS Interest Indication, MBMS Counting Response and Sidelink UE Information. In PHY layer, the sounding reference signal, SRS, is also used e.g., to estimate UL channel. In Light Connection, it is necessary to discuss if any of the indications should still be supported by the UE.

Proposal 4: RAN2 should discuss whether the UE in Light Connection continues the eNB assistance with Proximity Indication, In-device Coexistence Indication, UE Assistance Information, MBMS Interest Indication, MBMS Counting Response, Sidelink UE Information, and SRS.

2.2. Other Features 2.2.1. Dual Connectivity

In addition to SCell(s) discussed in section 2.1.3, it may be defined whether PSCell should be de-configured when the UE moves into Light Connection. If the PSCell is still applicable in Light Connection, it should also be discussed whether SCG Failure Indication needs to be declared.

Proposal 5: RAN2 should discuss whether PSCell is de-configured, when the UE moves into Light Connection.

2.2.2. WLAN Interworking/Aggregation (RALWI, RCLWI, LWA, LWIP)

In Rel-12 and Rel-13, a couple of mechanisms for WLAN Interworking were developed, i.e. RAN-assisted and RAN-controlled LTE-WLAN Interworking solutions, RALWI/RCLWI. The LWI mechanisms allow the NW to control UE in Connected its traffic steering to/from WLAN by the dedicated RAN assistance parameter or the steering command. After the UE transitions to IDLE, the configuration, which was set when the UE was in Connected, is still applicable during T350 is running. In addition for RALWI, SIB17 may provide the RAN assistance parameters and controls the UE in IDLE as well as in Connected. It should be further discussed how the UE performs RALWI/RCLWI under Light Connection.

Proposal 6: RAN2 should discuss how the UE performs RALWI/RCLWI during Light Connection.

In Rel-13, a set of WLAN aggregation solutions were specified, i.e., LTE-WLAN Aggregation (LWA) and one using IPsec tunnel (LWIP). The LWA bearer is routed over WLAN link and terminated at the eNB and the UE. Considering the Light Connection over Uu, it also needs to be clarified how the LWA configuration and LWA bearer(s) are handled when the UE is in Light Connection.

Proposal 7: RAN2 should discuss how the LWA bearer(s) is handled in Light Connection.

2.2.3. MDT

The minimization of drive test, MDT, was introduced in Rel-10 and continuously enhanced onward. The MDT consists of two modes, i.e., Logged MDT for IDLE/Connected modes and Immediate MDT for Connected mode. The MDT measurement log is sent over the measurement reporting when the UE is in Connected, wherein the logging continued even if the UE is in IDLE, in case of Logged MDT. For Light Connection, it has to be discussed which MDT mode is supported.

Proposal 8: RAN2 should discuss which MDT mode is supported for UEs in Light Connection.

2.2.4. MCLD

The multi-carrier load distribution, MCLD, supports the two redistribution mechanisms, the continuous redistribution scheme (CRS) and the one-shot scheme (OSS). These mechanisms are provided the redistribution parameter in SIB5/SIB8, and the UE in IDLE selects the redistribution target according to its IMSI upon either T360 expiry (CRS) or reception of the redistribution indication within the paging (OSS). For Light Connection, the load redistribution mechanisms may be applicable since current assumption is that the UE should perform UE-based mobility.

Proposal 9: RAN2 should discuss whether load redistribution is supported in Light Connection.

In addition to above, it may also have to discuss whether any enhancements are needed in the current features due to the introduction of Light Connection, e.g., some special handling such as an implicit deactivation/de-configuration.

Proposal 10: Additionally, RAN2 should also discuss whether any enhancements are necessary for the existing features due to the introduction of Light Connection.

The invention claimed is:

1. A user equipment used in a mobile communication system, the user equipment comprising:
a controller configured to, if the user equipment is in an RRC connected state, perform a predetermined function according to configuration parameters configured from a network, wherein
the controller is configured to,
acquire, from the network, a list including cell identifiers of cells forming a paging area of the user equipment in a specific state that is a state in which context information of the user equipment is maintained in the network, the specific state being a different state from the RRC connected state and an RRC idle state, and
in response to the transition of the user equipment from the RRC connected state to the specific state, invalidate at least a part of the configuration parameters,
the configuration parameters include dedicated configuration parameters individually configured to the user equipment,
the controller is configured to invalidate the dedicated configuration parameters in response to the transition of the user equipment from the RRC connected state to the specific state,
the controller is configured to receive, from the network, configuration information indicating whether transmission of a specific uplink signal is possible in the specific state,
the specific uplink signal is an uplink signal that the user equipment can transmit when the user equipment is in RRC connected state, and
the controller is configured to determine, based on the configuration information, whether to transmit the specific uplink signal when the user equipment is in the specific state.

2. The user equipment according to claim 1, wherein
the predetermined function is a function configured to perform communication by using a primary resource and a secondary resource at the same time, and
the controller is configured to invalidate the dedicated configuration parameters for the secondary resource in response to the transition of the user equipment from the RRC connected state to the specific state.

3. The user equipment according to claim 2, wherein
the primary resource is a primary cell, and
the secondary resource is a secondary cell.

4. The user equipment according to claim 2, wherein
the primary resource is a WWAN communication resource, and
the secondary resource is a WLAN communication resource.

5. The user equipment according to claim 2, wherein
the controller is configured to invalidate the dedicated configuration parameters for the secondary resource when a failure in the secondary resource is detected after the user equipment transitions from the RRC connected state to the specific state.

6. The user equipment according to claim 1, wherein
the predetermined function is semi-persistent scheduling, and
the controller is configured to invalidate the dedicated configuration parameters for the semi-persistent scheduling in response to the transition of the user equipment from the RRC connected state to the specific state.

7. The user equipment according to claim 1, wherein
the predetermined function is a steering function of switching traffic of the user equipment between WWAN communication and WLAN communication,
the controller is configured to use the dedicated configuration parameters for the steering function in a predetermined period after the transition from the RRC connected state to the specific state, and
the controller is configured to invalidate the dedicated configuration parameters for the steering function when the predetermined period has expired.

8. The user equipment according to claim 1, wherein
the controller is configured to perform a process of receiving, from the network, configuration information for controlling transmission of the specific uplink signal in the specific state,
the controller is configured to control transmission of the specific uplink signal based on the configuration information after the user equipment transitions from the RRC connected state to the specific state.

9. The user equipment according to claim 8, wherein
the specific uplink signal is an uplink signal including measurement information obtained when the user equipment measures a downlink radio state.

10. The user equipment according to claim 8, wherein
the specific uplink signal is an uplink signal including notification information for assisting determination or measurement performed by the network.

11. The user equipment according to claim 1, wherein
the controller is configured to measure a downlink radio state if the user equipment is in the specific state,
the controller is configured to perform measurement in predetermined area units including a plurality of cells, instead of cell units.

12. The user equipment according to claim 1, wherein
the controller is configured to perform a process of receiving, from the network, information indicating a radio resource pool for uplink transmission, and
if the user equipment is in the specific state, the controller is configured to select a radio resource from the radio resource pool and perform the uplink transmission by using the selected radio resource.

13. The user equipment according to claim 1, wherein
the controller is configured to, if the user equipment is in the specific state, perform cell reselection of reselecting a target cell to be used as a serving cell of the user equipment,
the cell reselection includes a redistribution procedure for allocating the target cell selected as the serving cell.

14. The user equipment according to claim 13, wherein
the controller is configured to invalidate the redistribution procedure in a predetermined period after the user equipment transitions from the RRC connected state to the specific state.

15. The user equipment according to claim 13, wherein
the controller is configured to perform the cell reselection in the specific state by using a special redistribution procedure in which a redistribution procedure for an RRC idle state is changed.

16. The user equipment according to claim 1, wherein
the controller is configured to, if the user equipment is in the specific state, perform cell reselection of reselecting a target cell to be used as a serving cell of the user equipment,
the controller is configured to record information about the cell reselection performed during the specific state, and
the controller is configured to transmit the recorded information to the network.

17. A processor for a user equipment used in a mobile communication system, the processor is configured to
if the user equipment is in an RRC connected state, perform a predetermined function according to configuration parameters configured from a network, wherein
the processor is configured to,
acquire, from the network, a list including cell identifiers of cells forming a paging area of the user equipment in a specific state that is a state in which context information of the user equipment is maintained in the network, the specific state being a different state from the RRC connected state and an RRC idle state, and
in response to the transition of the user equipment from the RRC connected state to the specific state, invalidate at least a part of the configuration parameters,
the configuration parameters include dedicated configuration parameters individually configured to the user equipment,
the processor is configured to
invalidate the dedicated configuration parameters in response to the transition of the user equipment from the RRC connected state to the specific state;
receive from the network, configuration information indicating whether transmission of a specific uplink signal is possible in the specific state; and
determine, based on the configuration information, whether to transmit the specific uplink signal when the user equipment is in the specific state, and
the specific uplink signal is an uplink signal that the user equipment can transmit when the user equipment is in RRC connected state.

18. A method for a user equipment used in a mobile communication system, the method comprising:
if the user equipment is in an RRC connected state, performing a predetermined function according to configuration parameters configured from a network;
acquiring, from the network, a list including cell identifiers of cells forming a paging area of the user equipment in a specific state that is a state in which context information of the user equipment is maintained in the network, the specific state being a different state from the RRC connected state and an RRC idle state; and
in response to the transition of the user equipment from the RRC connected state to the specific state, invalidating at least a part of the configuration parameters, wherein
the configuration parameters include dedicated configuration parameters individually configured to the user equipment,
the invalidating comprises invalidating the dedicated configuration parameters in response to the transition of the user equipment from the RRC connected state to the specific state, the method further comprising
- receiving, from the network, configuration information indicating whether transmission of a specific uplink signal is possible in the specific state; and
- determining, based on the configuration information, whether to transmit the specific uplink signal when the user equipment is in the specific state, and the specific uplink signal is an uplink signal that the user equipment can transmit when the user equipment is in RRC connected state.

* * * * *